United States Patent [19]

Opitz et al.

[11] Patent Number: 5,744,233
[45] Date of Patent: Apr. 28, 1998

[54] METHOD OF COATING LUMINESCENT POWDERS, LUMINESCENT POWDERS AND COATED OBJECT

[75] Inventors: Joachim Opitz, Aachen; Walter Mayr, Würselen, both of Germany

[73] Assignee: U.S. Philips Corporation, New York, N.Y.

[21] Appl. No.: 526,023

[22] Filed: Sep. 8, 1995

[30] Foreign Application Priority Data

Sep. 9, 1994 [DE] Germany ............... 44 32 035.3

[51] Int. Cl.[6] .................... B32B 5/16; H01J 29/10; B05D 7/00
[52] U.S. Cl. .................... 428/328; 313/463; 313/483; 313/502; 313/503; 427/215; 427/219; 428/329; 428/331; 428/404; 428/917
[58] Field of Search ................... 427/212, 215, 427/217, 219, 213.3, 157; 428/403, 404, 917, 331, 328, 329; 313/463, 467, 483, 502, 503, 512

[56] References Cited

U.S. PATENT DOCUMENTS

| | | | |
|---|---|---|---|
| 4,110,492 | 8/1978 | Hayman | 427/214 |
| 4,156,885 | 5/1979 | Budd | 427/70 |
| 4,902,929 | 2/1990 | Toyoda et al. | 313/503 |
| 5,064,690 | 11/1991 | Sando et al. | 427/215 |
| 5,098,740 | 3/1992 | Tewari | 427/215 |
| 5,185,207 | 2/1993 | Furuoka et al. | 428/404 |
| 5,196,229 | 3/1993 | Chau | 427/66 |
| 5,262,201 | 11/1993 | Chandra et al. | 427/376.2 |
| 5,369,331 | 11/1994 | Mizukami et al. | 313/467 |
| 5,418,062 | 5/1995 | Budd | 428/403 |
| 5,439,705 | 8/1995 | Budd | 427/212 |

Primary Examiner—H. Thi Le
Attorney, Agent, or Firm—Norman N. Spain

[57] ABSTRACT

The invention relates to a method of coating luminescent powders with a coating which comprises silicon dioxide, which method is characterized in that in a first step luminescent particles are dispersed in a solution containing one or more metallo-organic compounds of silicon and, optionally, metallo-organic compounds of further elements in a hydrous solvent mixture having a pH-value of $1<pH\ 5$, whereafter the metallo-organic compounds are hydrolysed by adding ammonia. A further aspect of the invention relates to a luminescent powder having a coating composed of silicon oxide and at least one oxide of a further element selected from the group formed by aluminum, barium, lead, boron, magnesium, titanium, zinc, zirconium, cobalt, copper and iron. Another aspect of the invention relates to a coated object, such as a fluorescent screen or display screen for a cathode ray tube or lamp or for other electrical discharge tubes or lamps, in particular also color television display screens, which is coated with a luminescent powder coated in accordance with the invention.

10 Claims, No Drawings

METHOD OF COATING LUMINESCENT POWDERS, LUMINESCENT POWDERS AND COATED OBJECT

BACKGROUND OF THE INVENTION

The invention relates to a method of providing luminescent powders with a coating which comprises silicon dioxide, a luminescent powder having such a coating and an object coated with such a luminescent powder, for example a fluorescent screen or display screen for a cathode ray tube or cathode ray lamp or for other electrical discharge tubes or discharge lamps.

Luminescent powders manufactured in accordance with the customary method, i.e. in a solid-state reaction followed by wet-chemical cleaning generally tend to agglomerate. This applies in particular to sulphidic luminescent powders but also to many other luminescent substances. Consequently, it is difficult to obtain a uniformly dispersed coating solution for coating fluorescent screens, display screens of television receivers etc from untreated luminescent powders.

For this reason, luminescent powders are customarily provided with a coating to obtain free-flowing powders which can be readily dispersed. State-of-the-art coatings which primarily reduce the agglomeration tendency of the powders generally comprise small particles, for example sub-micron particles, which are "glued" on to the fluorescent particles. For example, in JP 2-199187 (A), it is proposed to coat fluorescent particles with spherical silicate particles made from ethyl silicate, ethanol and ammonia.

However, such a discontinuous coating of discrete particles is insufficient if the luminescent powders are subject to chemical attacks at a later stage such as, for example, in the manufacture of color television display screens.

To manufacture color television display screens, small sub-millimetric fluorescent dots or strips are provided on the screen. This is done by means of photochemical methods in which either photosensitive suspensions of luminescent powders in polyvinyl alcohol with ammonium dichromate as the active system are used, the suspension being cured by light, or photoresist lacquers are used to which the dry luminescent powders adhere after exposure to light. Subsequently, the screens are subjected to burn-in, in which the unprotected luminescent powders are also attacked by oxygen and atmospheric humidity.

Thus, it is advisable to protect the luminescent powders by means of a continuous coating against chemical attack by chromate, oxygen and atmospheric humidity. Particularly ammonium dichromate is a strong oxidant which can react with the surface of the dispersed luminescent powder without the action of light ("dark reaction"), which leads to undesirable effects on the coated screens, for example fogging.

A method of treating the surface of luminescent particles, which consists essentially in forming a continuous silicon dioxide film on the surface of each luminescent particle by treating said luminescent particles with a solution which comprises an aqueous solution of an organic alkaline compound such as choline, tetramethyl ammonium hydroxide, tetraethyl ammonium hydroxide, tetrapropyl ammonium hydroxide, tetrabutyl ammonium hydroxide, tributyl monoethyl ammonium hydroxide, trimethyl monooctyl ammonium hydroxide, triethyl monophenyl ammonium hydroxide and silicon dioxide in an aqueous solution is disclosed in U.S. Pat. No. 4,287,229.

Organic amines, however, have fallen into disrepute because these amines or the contaminants which they contain are carcinogenic. Consequently, the above-mentioned method is unsuitable for large-scale production.

SUMMARY OF THE INVENTION

It is an object of the invention to provide an improved method of coating luminescent powders, which is suitable for large-scale production and by means of which a luminescent powder is obtained which is protected against chemical attack and which is liquid and readily dispersable.

In accordance with the invention, this object is achieved by a method which is characterized in that, in a first step luminescent particles are dispersed in a solution comprising one or more metallo-organic compounds of silicon and, optionally, metallo-organic compounds of further elements in an aqueous solvent mixture having a pH-value of 1 <pH<5, whereafter the metallo-organic compounds are hydrolyzed in the presence of ammonia.

The $SiO_2$-containing coating thus provided has very good mechanical and optical properties. This coating is thin, yet forms a homogeneous, dense and, in particular, a continuous layer. This layer has an improved abrasion resistance because it has a smooth surface. In addition, this layer is resistant to many chemicals other than strong alkalies and hydrofluoric acid, and it protects the substrate against chemical attack because the coating has a uniform density and adheres well to the base material.

As the pores of the amorphous coating are few and very small, said coating is highly transparent.

The surface of the coating is hydrophilic, so that the coated luminescent powder can readily be wetted. This luminescent powder does not form agglomerates, neither as a dry powder nor in solution, so that these luminescent powders coated in accordance with the invention can be used to manufacture homogeneously coated objects by means of either dry or wet methods.

In accordance with a preferred embodiment of the inventive method, the luminescent particles are dispersed at a temperature in the range from 40°–90° C. and, before being hydrolyzed, the dispersion thus obtained is cooled to room temperature.

It has been found that such a method enables very homogeneously coated luminescent powders to be obtained, while separate deposition of spherical $SiO_2$ particles is completely avoided.

It is further preferred that the luminescent powder is dispersed in the ammoniacal solution for 1 to 12 hours. In this process, the layer thickness increases with time, until it reaches a limiting value of 50 to 100 nm.

It may also be preferred that the further elements are aluminum, barium, lead, boron, lanthanum, magnesium, zinc, titanium or zirconium and that the molar ratio between the metallo-organic compounds of silicon and the metallo-organic compounds of the further elements is in the range from 100:0.1 to 100:15.

The above-mentioned elements are incorporated in the amorphous coating and modify the optical properties thereof. For example, the reflectance is changed by varying the refractive index. The refractive index is increased by PbO, BaO, $La_2O_3$, $TiO_2$; color dispersion being high in coatings comprising PbO and lower in coatings comprising BaO or $La_2O_3$. In coatings comprising BaO and particularly $La_2O_3$, optical refraction is high and color dispersion is low.

The excellent homogeneity of such multicomponent coatings is made possible by the fact that the starting compounds in solution can be homogeneously mixed before being hydrolyzed.

To improve the chromatic value of the luminescent powder, it may be preferred that the other elements are chromophoric elements such as cobalt, copper and iron and that the molar ratio between the metallo-organic compounds of silicon and the metallo-organic compounds of said chromophoric elements is in the range from 100:0.1 to 100:5.

A further aspect of the invention relates to a luminescent powder having a coating which is composed of silicon oxide and at least one oxide of a further element, said further elements being selected from the group formed by aluminum, barium, lead, boron, magnesium, titanium, zinc, zirconium, cobalt, copper and iron.

Yet another aspect of the invention relates to an object coated with a luminescent powder coated in accordance with the invention, such as a fluorescent screen or display screen for a cathode ray tube or lamp or for other electrical discharge tubes or lamps as well as, in particular, color television display screens.

These and other aspects of the invention will be apparent from and elucidated with reference to the embodiments described hereinafter.

The substrate for the coating method in accordance with the invention is composed of inorganic luminescent substances in accordance with the state of the art, as described, for example, in Ullmanns Encyklopädie der technischen Chemie, vol. 16, page 179 ff., Weinheim, New York (1978). The inorganic luminescent substances used are, in particular, the green luminescent substances $Y_2SiO_5$:Tb, ZnS:Cu,Au, Al; Zn,CdS:Cu,Al and CaS:Ce, the red luminescent substances $Y_2O_2S$:Eu, $Y_2O_3$:Eu and CaS:Eu, as well as the blue luminescent substances ZnS:Ag in the wurtzite and sphalerite modifications.

These luminescent substances can be primary particles or luminescent substances which have been pretreated with pigments and latex. The grain size of the luminescent particles is not critical. The primary grain size of commercially available luminescent substances ranges from approximately 3 to 15 μu.

These substrate particles are coated with a thin uniform and continuous layer of silicon dioxide or silicon dioxide with admixtures of PbO, BaO, $La_2O_3$, $TiO_2$, $B_2O_3$, $Al_2O_3$, $ZrO_2$, ZnO, MgO, CoO, $Fe_2O_3$ and CuO.

The starting compounds for the coatings are composed of the metallo-organic compounds of said oxides, i.e. compounds in which said metals and semimetals are bound to an organic residue via oxygen. Such metallo-organic compounds are, for example, alkoxides, acetylacetonates or carboxylates of metals.

Efficaciously, metallo-organic starting compounds are used which can be dissolved in water and alcohol and which do not form a precipitate of insoluble reaction products in an acid reaction medium. Preferably, tetraethoxy silane, tetramethoxy silane or polyethylsilicate is used as the starting compound for silicon dioxide, lead acetate, Pb-2ethylhexanoate or Pb-neodecanoate is preferably used as the starting compound for lead oxide, barium acetate is preferably used as the starting compound for barium oxide, lanthanum isopropoxide, anhydrous lanthanum acetate or lanthanum acetylacetonate is preferably used as the starting compound for lanthanum oxide, isopropylates, butylates and acetyl acetonates and Ti-di-methoxy-di-neodecanoate are preferably used as the starting compounds for titanium oxide and zirconium oxide, the so-called borate esters, for example boric acid triethyl ester $B(OC_2H_5)_3$, are preferably used as the starting compounds for boron oxide, the formiates $HO-Al(OOCH)_2$.aq or $Al(OOCH)_3$.aq or alcoholates such as aluminium isopropylate, are preferably used as the starting compounds for aluminium oxide, zinc acetate is preferably used as the starting compound for zinc oxide, magnesium methoxide Mg(OCH3)2 is preferably used as the starting compound for magnesium oxide, cobalt(II)-acetylacetonate is preferably used as the starting compound for cobalt oxide, iron-(III)-acetylacetonate $Fe(O_2H_2C_5)_3$ is preferably used as the starting compound for iron oxide, and copper(II)-acetylacetonate is preferably used as the starting compound for copper.

These starting compounds are dissolved in a hydrous solvent mixture in which the above starting compounds can be readily dissolved and which satisfactorily wets the luminescent particles, for example water/alcohol mixtures comprising various alcohols such as methanol, ethanol, propanol, i-propanol, butanol, i-butanol, ethyleneglycol and glycerol. The mixing ratio of alcohol to water can range from 100:1 to 1:10, said ratio typically is 6:1.

The metallo-organic compounds are dissolved in these solvent mixtures in a total concentration of 0.01 mol/l to 0.1 mol/l . The molar ratio of silicon to the admixtures of aluminum, barium, lead, boron, lanthanum, magnesium, titanium, zinc and zirconium ranges from 100:0.1 to 100:15.

The color-influencing additives of cobalt, copper and iron can be admixed in quantities of from 100:0.1 to 100:5.

Prior to admixing the metallo-organic compound, the pH of the solvent is set to a value between 1 and 5 by means of an inorganic acid such as hydrochloric acid or an organic acid such as acetic acid.

Optionally, the solution of the starting compounds in the hydrous solvent can be heated to higher temperatures, up to the boiling point of the solvent mixture used, for some time until a hydrolysis reaction of the starting compounds with water takes place which is sufficient at this temperature, so that the formation of an appreciable precipitate is just avoided.

Optionally, the solution is hot-filtered.

The powdery luminescent substance to be coated is added to the solution while stirring. If necessary, an additional dispersing step using a disperser or ultrasound is carried out to preclude that agglomerates which are not completely dispersed are jointly coated. The concentration of the luminescent substance in the dispersion may range from 5 g/l to 200 g/l. The best results were obtained with concentrations in the range from 80 to 120 g/l.

This suspension is stirred for several hours at the above-mentioned reaction temperature. Subsequently, the suspension is cooled to room temperature in accordance with its natural cooling curve, whereafter the suspension is stirred and ammonia added until a pH-value of 8–10 is obtained.

The ammoniacal suspension can be dispersed further for some time at room temperature to promote the desired ageing of the silicon-oxide containing coating by means of which the thickness of the coating can be varied.

Subsequently, the coated luminescent powder thus obtained is separated from the reaction solution by suitable methods such as filtration or centrifuging, whereafter it is washed with a solvent mixture of ethanol and water.

The thickness of the $SiO_2$-containing coating can be varied by the duration of the ageing process. The coating thickness typically ranges between 5 and 100 nm. The layer thickness is determined either by element-analytical methods or by surface-analysis methods such as ESCA and EDAX.

The amorphous $SiO_2$-containing coating obtained by the inventive method is almost free of pores and the few existing pores are so small that they do not allow the substrate to be chemically attacked. To investigate the protective effect of the coating against oxidative attack on oxidation-sensitive luminescent substances such as luminescent substances on the basis of ZnS, a diluted, soft violet potassium permanganate solution is added to the luminescent powders. Untreated luminescent powders immediately decolor the potassium permanganate solution, however, even after several hours, the luminescent powders coated in accordance with the invention are not attacked.

As the amorphous coating does not comprise pores which are larger than the wavelength of the light which it should allow to pass, said coating is highly transparent.

The surface of the amorphous $SiO_2$-containing coating formed is hydrophilic and the coated luminescent powders have the same colloidochemical properties, irrespective of their chemical structure. By virtue thereof, a uniform formulation for the various suspensions in the manufacture of display screens is possible, and colloidochemically stable suspensions are obtained.

In order to be used for the manufacture of coated objects, such as discharge tubes or lamps, said luminescent powders must be formed into stable colloidal suspensions, in which case it is not only important that the suspensions do not exhibit the tendency to flocculate as a result of agglomeration, but also that luminescent powders of chemically very different luminescent substances demonstrate colloidochemical properties which are as identical as possible.

The colloidochemical stability can be determined by measuring the zeta-potential of the suspensions. In this respect, the outward behaviour of the luminescent substances coated with amorphous $SiO_2$ in accordance with the invention behave is the same as that of amorphous $SiO_2$ particles.

Consequently, the inventive, coated luminescent powders for coating solutions can be used to produce stable colloidal solutions having a uniform pH-value of 10 pH >5 and strongly negatively charged particles, whereas the uncoated powders demonstrate different surface charges caused by differences in chemical structure, and they must be individually stabilized at different pH-values by means of further measures.

DESCRIPTION OF THE PREFERRED EMBODIMENTS

EXAMPLE 1

A quantity of 0.576 l of a solution of acetic acid in water having a pH-value of 5 is mixed with 3.379 l ethanol. A quantity of 45 ml tetraethoxy silane is added to the solution which is subsequently stirred at room temperature for 0.5 h. A quantity of 400 of a green-luminescing powder of the chemical composition Zn,CdS:Cu,Al are then dispersed in the solution and stirred for 16 hours. Subsequently, 500 ml of a 2-molar ammonia solution are added to the resultant suspension which is subsequently stirred for one hour.

The luminescent powder thus coated is separated out by centrifuging and washed with a water/ethanol mixture (1:1), whereafter it is dried in a vacuum at 120° C.

Analysis of the powder surface by means of the ESCA method yielded a degree of coverage of 99.1%. By conducting ESCA measurements and simultaneously sputtering the surface, the layer thickness obtained can be estimated at 18 nm.

The chemical stability of the surface against oxidation by a permanganate solution was improved by a factor of 100 as compared to the uncoated Zn,CdS:Cu,Al.

EXAMPLE 2

A quantity of 4.0 l of a 0.05 molar tetramethoxy silane solution in isopropanol is mixed with water, whose pH-value was set to 4.2 by adding acetic acid, until the water concentration is 8 mol/l. This solution is heated to 60° C for one hour. Subsequently, 400 g of a red-luminescing substance of $Y_2O_2S$, which is pigmented with fine-grained $Fe_2O_3$ and latex, are added and stirred at 60° C for 16 hours. The resultant suspension is then cooled to room temperature and 500 ml of a 2-molar ammonia solution is added dropwise to the suspension. The suspension and the thus coated luminescent powder is aged for 5 hours, decanted through a filter, washed and dried, as described in example 1.

ESCA analysis reveals that the surface is coated for 95%.

Also the electroluminescent efficiency of coated and uncoated luminescent material was measured at an exciting voltage of 10 kV. Due to the coating, the luminescent efficiency was slightly reduced by 0.7% as compared to the uncoated luminescent material.

EXAMPLE 3

A quantity of 0.15 l water were mixed with 1 l ethanol and the pH-value was set to 4.2 by means of acetic_acid. In this solvent mixture a quantity of 0.03 mol tetraethoxy silane and 5 mmol boric acid ethyl ester are dissolved. The solution is heated to 60° C. and maintained at this temperature for one hour, whereafter it is hot-filtered. A quantity of 130 g of a green-luminescing ZnS:Cu luminescent powder are introduced into the filtered solution and dispersed by means of a high-velocity agitator. The solution was cooled while stirring. Subsequently, 0.4 mol ammonia gas was blown into the solution and the resultant suspension was stirred for 5 hours.

The suspension was centrifuged, and the thus coated luminescent powder was washed several times with alcohol and water and, subsequently, dried

EXAMPLE 4

A quantity of 0.15 l water are mixed with 1 l methanol and the pH-value was set to 3 by adding formic acid. A quantity of 0.3 mol tetraethoxy silane and 5 mmol aluminum-triformate are dissolved in this solvent mixture. This solution is heated to 60° C. and maintained at this temperature for one hour after which it is hot-filtered. A quantity of 130 g of a green-luminescing ZnS:Cu luminescent powder are introduced into the filtered solution and dispersed by means of a high-velocity agitator. The solution is cooled while stirring, whereafter 0.4 mol ammonia gas is blown into the solution and the suspension is stirred for 5 hours.

The dispersion was centrifuged, and the thus coated luminescent powder was washed several times with alcohol and water and subsequently dried.

EXAMPLE 5

In this example, particles of a red-luminescing substance of $Y_2O_3$: Eu were provided with a coating of silicon oxide and zirconium oxide in which iron ions were incorporated as colorants.

To this end, first a solution of 0.35 mol tetramethoxy silane and 50 mmol zirconium-tetra-isopropylate in 10 l isopropanol are prepared and, subsequently, a solution of 2 l water, whose pH-value is set to 4 by adding acetic acid, are added thereto. Simultaneously, 10 mmol iron(III) acetylacetonate are dissolved in 1 l isopropanol. The solutions are mixed and heated to 60° C. for 2 hours.

A quantity of 1200 g Y$_2$O$_3$: Eu powder are stirred into the mixed solutions by means of an agitator, dispersed in an ultrasonic flow cell and cooled to room temperature. Subsequently, 1500 ml of a 2-molar ammonia solution are added dropwise and the suspension is stirred for 1 hour. Processing of the dispersion takes place in the same manner as described in the preceding examples.

As a result of the iron(III)-ions incorporated in the coating, a light brown luminescent substance is obtained. The color can be changed to reddish brown by subjecting the coated luminescent substance to a thermal aftertreatment.

EXAMPLE 6

First, a solution of 0.35 mol tetramethoxy silane and 50 mmol zinc acetate in 10 l isopropanol is prepared to which a solution of 2 l water is added, the pH-value of which is set to 4 by adding acetic acid.

A quantity of 1200 g of the green luminescent substance Y$_2$SiO$_5$:Tb is stirred into this solution by means of an agitator, ultrasonically dispersed for 15 minutes and cooled to room temperature. Subsequently, 1500 ml of a 2-molar ammonia solution are added dropwise and the suspension is stirred for 1 hour.

Processing of the suspension takes place in the same manner as described in the preceding examples.

EXAMPLE 7

First, a solution of 0.35 mol polyethyl silicate and 50 mmol barium acetate in 10 l isopropanol are prepared, and subsequently a solution of 2 l water, whose pH-value is set to 4 by adding acetic acid, are added. Simultaneously, 10 mmol aluminum formiate are dissolved in 1 l isopropanol. The solutions are mixed and heated to 60° C. for 2 hours.

A quantity of 1200 g ZnS:Ag powder is stirred into said mixed solutions by means of an agitator, dispersed for 15 minutes in an ultrasonic flow cell and cooled to room temperature. Subsequently, 1500 ml of a 2-molar ammonia solution are added dropwise and the suspension is stirred for 1 hour.

Processing of the suspension takes place in the same manner as described in the preceding examples.

We claim:

1. A method of providing luminescent powders with a coating comprising silicon dioxide comprising dispersing luminescent particles in a solution comprising at least one metallo-organic compound of silicon and, optionally, one or more metallo-organic compounds of further elements, in one aqueous organic solvent mixture having a pH value of 1<pH<5 and then adding ammonia to the resultant dispersion to catalyze hydrolysis of the metallo-organic compound(s) to oxides.

2. A method of claim 1 wherein the luminescent particles are dispersed at a temperature of 40°–90° C., the resultant dispersion was cooled to room temperature and ammonia was added to the cooled dispersion.

3. A method as claimed in claim 2 wherein the further elements are selected from the group consisting of aluminum, barium, lead, boron, lanthanum, magnesium, titanium, zinc, zirconium; and mixtures thereof and the molar ratio between the metallo-organic compounds of silicon and the metallo-organic compounds of the further elements is in the range from 100:0.1 to 100:15.

4. A method as claimed in claim 2, wherein the further elements are chromophoric elements selected from the group consisting of cobalt, copper and iron, and the molar ratio between the metallo-organic compounds of silicon and the metallo-organic compounds of said chromophoric elements is in the range from 100:0.1 to 100:5.

5. A method as claimed in claim 1, wherein the luminescent particles are disperse in the ammoniacal dispersion for 1 to 12 hours.

6. A method as claimed in claim 5 wherein the further elements are selected from the group consisting of aluminum, barium, lead, boron, lanthanum, magnesium, titanium, zinc, zirconium, and mixtures thereof and the molar ratio between the metallo-organic compounds of silicon and the metallo-organic compounds of the further elements is in the range from 100:0.1 to 100:15.

7. A method as claimed in claim 1 wherein the further elements are selected from the group consisting aluminum, barium, lead, boron, lanthanum, magnesium, titanium, zinc, zirconium, and mixtures thereof and the molar ratio between the metallo-organic compounds of silicon and the metallo-organic compounds of the further elements is in the range from 100:0.1 to 100:15.

8. A method as claimed in claim 1, wherein the further elements are chromophoric elements selected from the group consisting of cobalt, copper and iron, and the molar ratio between the metallo-organic compounds of silicon and the metallo-organic compounds of said chromophoric elements is in the range from 100:0.1 to 100:5.

9. A luminescent powder having a coating formed by the method of claim 1 and consisting essentially of silicon dioxide and at least one oxide of a further element selected from the group consisting of aluminum barium, lead, lanthanum, boron, magnesium, titanium, zinc, zirconium, cobalt, copper and iron and wherein the molar ratio of silicon dioxide to the oxide of the further element is within the range of 100:0.1 to 100:15.

10. A luminescent screen or display screen coated with a luminescent powder of claim 9.

* * * * *